(12) United States Patent
Seno et al.

(10) Patent No.: US 11,015,038 B2
(45) Date of Patent: May 25, 2021

(54) ETHYLENE-VINYL ALCOHOL COPOLYMER PELLETS, AND PRODUCTION METHOD FOR ETHYLENE-VINYL ALCOHOL COPOLYMER PELLETS CONTAINING CONJUGATED POLYENE AND ALKALI EARTH METAL

(71) Applicant: MITSUBISHI CHEMICAL CORPORATION, Tokyo (JP)

(72) Inventors: Ryuta Seno, Osaka (JP); Makoto Hatanaka, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/453,142

(22) Filed: Jun. 26, 2019

(65) Prior Publication Data

US 2019/0315941 A1    Oct. 17, 2019

Related U.S. Application Data

(63) Continuation of application No. PCT/JP2017/047095, filed on Dec. 27, 2017.

(30) Foreign Application Priority Data

Dec. 28, 2016  (JP) .............. JP2016-257025

(51) Int. Cl.
| | | |
|---|---|---|
| C08K 5/098 | (2006.01) | |
| C08F 216/06 | (2006.01) | |
| C08J 3/14 | (2006.01) | |
| C08J 3/205 | (2006.01) | |
| C08K 5/09 | (2006.01) | |

(52) U.S. Cl.
CPC ............ *C08K 5/098* (2013.01); *C08F 216/06* (2013.01); *C08J 3/14* (2013.01); *C08J 3/2053* (2013.01); *C08K 5/09* (2013.01); *C08F 2800/10* (2013.01)

(58) Field of Classification Search
CPC ......... C08K 5/098; C08K 5/09; C08F 216/06; C08F 2800/10; C08J 3/2053; C08J 3/14
USPC ......................................... 524/287
See application file for complete search history.

(56) References Cited

U.S. PATENT DOCUMENTS

| | | |
|---|---|---|
| 5,744,547 A | 4/1998 | Moritani et al. |
| 9,453,094 B2 | 2/2016 | Nakazawa et al. |
| 2015/0159005 A1* | 6/2015 | Nakazawa .............. B32B 27/08 426/412 |

FOREIGN PATENT DOCUMENTS

| | | |
|---|---|---|
| JP | H9-71620 | 3/1997 |
| JP | 2003-89706 | 3/2003 |
| WO | 2013/187454 | 12/2013 |

OTHER PUBLICATIONS

International Search Report issued in Patent Application No. PCT/JP2017/047095 dated Mar. 27, 2018 with English translation.
English Translation of International Preliminary Report on Patentability issued in Patent Application No. PCT/JP2017/047095 dated Jul. 11, 2019.

* cited by examiner

*Primary Examiner* — Hui H Chin
(74) *Attorney, Agent, or Firm* — Greenblum & Bernstein, P.L.C.

(57) ABSTRACT

Ethylene-vinyl alcohol copolymer pellets comprise: an ethylene-vinyl alcohol copolymer; a conjugated polyene; and 1 to 200 ppm of an alkali earth metal based on the weight of the pellets; wherein pellet surface portions of the ethylene-vinyl alcohol copolymer pellets have a conjugated polyene content of not lower than 30 ppb based on the weight of the pellets. Such ethylene-vinyl alcohol copolymer pellets are capable of reliably suppressing occurrence of minute fisheyes each having a diameter of not greater than 200 μm.

10 Claims, No Drawings

ETHYLENE-VINYL ALCOHOL COPOLYMER PELLETS, AND PRODUCTION METHOD FOR ETHYLENE-VINYL ALCOHOL COPOLYMER PELLETS CONTAINING CONJUGATED POLYENE AND ALKALI EARTH METAL

RELATED APPLICATION

This application is a continuation of International Application No. PCT/JP2017/047095, filed on Dec. 27, 2017, which claims priority to Japanese Patent Application No. 2016-257025 filed on Dec. 28, 2016, the entire contents of each of which is hereby incorporated by reference.

TECHNICAL FIELD

The present disclosure relates to ethylene-vinyl alcohol copolymer (hereinafter sometimes referred to simply as "EVOH") pellets which are excellent in formability and can provide a film having very few fisheyes when being used for film formation. More specifically, the present disclosure relates to EVOH pellets which have a controlled conjugated polyene content in pellet surfaces thereof and contain a predetermined amount of an alkali earth metal, and to a production method for the EVOH pellets.

BACKGROUND ART

The EVOH has crystalline portions formed due to firm hydrogen bonds between hydroxyl groups present in its molecular chains, and these crystalline portions prevent intrusion of gas such as oxygen from the outside. Therefore, the EVOH is excellent in gas barrier properties, e.g., oxygen barrier property. Taking advantage of the excellent gas barrier properties, the EVOH is formed into films, sheets, bottles, and other containers for use as food packaging materials, pharmaceutical product packaging materials, industrial chemical packaging materials, agricultural chemical packaging materials, and the like.

The EVOH is typically melt-formed and/or processed into film form, sheet form, bottle form, cup form, tube form, pipe form, and the like for practical applications. Therefore, the formability and the processability of the EVOH are important factors.

The EVOH contains relatively active hydroxyl groups in its molecule. Therefore, the EVOH is liable to experience oxidation reaction and crosslinking reaction even in a generally oxygen-free environment in an extruder to thereby produce a thermal degradation product when being heat-melted at a higher temperature. It is known that the thermal degradation product is disadvantageously liable to cause gel-like blobs which may cause fisheyes.

For elimination of such a disadvantage, PTL 1 proposes an EVOH composition which contains an EVOH and a conjugated polyene for suppression of the fisheyes, the gel-like blobs, and the like which may occur in the melt forming.

PTL 1 discloses a method in which a conjugated polyene having a boiling point of not lower than 20° C. is added to a copolymer prepared by copolymerizing monomers including vinyl acetate in a vinyl acetate copolymer preparation process, and then the resulting vinyl acetate copolymer is saponified. PTL 1 also discloses that an EVOH composition prepared by this method contains an EVOH and 0.00002 to 1 wt. % (0.2 ppm to 10,000 ppm), preferably 0.0001 to 0.2 wt. % (1 ppm to 2,000 ppm), of the conjugated polyene having a boiling point of not lower than 20° C. (paragraph [0034] of PTL 1).

PTL 1 states that, if the polyene compound remains in the final saponification product, a packaging container or the like formed from the EVOH composition is liable to suffer from emanation of odor and bleeding and, therefore, an excess amount of the remaining polyene compound is not preferred, and that a polyene compound which can be easily rinsed away with water after the saponification is preferably used (paragraph [0011] of PTL 1).

More specifically, the EVOH is prepared by polymerizing ethylene and vinyl acetate under ethylene pressure, adding the conjugated polyene to the resulting copolymer, removing remaining ethylene from the copolymer, and saponifying the resulting copolymer, and then rinsed with a great amount of water, whereby intended EVOH particles are produced (Example 1 of PTL 1).

PTL 1 states that a film formed by using the EVOH particles thus produced is less liable to suffer from coloration, and the number of gel-like blobs each having a size of not less than 100 μm is 3 to 10 per 100 $cm^2$ of the film (see Table 1 of PTL 1).

PTL 2 discloses a method for producing a vinyl alcohol polymer capable of suppressing fisheyes, coloration, and odor emanation in a forming process. In the vinyl alcohol polymer production method, the vinyl alcohol polymer is produced by polymerizing a vinyl acetate compound, removing unreacted vinyl acetate in a distillation column, and adding at least one of N,N-dialkylhydroxylamine, styrene derivative, hydroquinone derivative, quinone derivative, piperidine derivative, and conjugated polyene as a polymerization inhibitor to the resulting polymer.

RELATED ART DOCUMENTS

Patent Documents

PTL 1: JP-A-HEI9(1997)-71620
PTL 2: JP-A-2003-89706

SUMMARY

With recent increasingly stricter requirements for the appearance and the odor of the packaging material, it is desirable to more reliably suppress the occurrence of the fisheyes while ensuring the melt formability. Particularly, there is a demand for EVOH pellets capable of sufficiently suppressing the occurrence of minute fisheyes each having a diameter of not greater than 200 μm.

In view of the foregoing, it is an object of the present disclosure to provide EVOH pellets excellent in formability and capable of reliably suppressing the occurrence of minute fisheyes each having a diameter of not greater than 200 μm, and to provide a method for producing the same.

The inventors conducted various studies on conjugated polyene-containing EVOH pellets in relation to the occurrence of the fisheyes and, as a result, found that, where the EVOH pellets have a conjugated polyene content not less than a predetermined level in surface portions thereof, the EVOH pellets are capable of suppressing the occurrence of the fisheyes. Although a mechanism for this fisheye-suppressing effect is not clarified, the fisheye-suppressing effect can be provided supposedly because the conjugated polyene present in not less than the predetermined amount in the pellet surfaces of the conjugated polyene-containing EVOH pellets functions to trap radicals which may locally occur in the near-surface portions of the pellets when the pellet surfaces are brought into contact with high-temperature metal portions of a barrel, a screw, and the like of an extruder during the melting of the EVOH pellets in the extruder.

However, it was found that, when the EVOH pellets having a higher conjugated polyene concentration in the pellet surface portions are fed into the extruder for melt forming, an increased number of abnormal noises occur below a hopper of the extruder. This means that a load is exerted on the screw of the extruder in a melt plasticizing section of the extruder for melting the pellets, and that the pellets are not smoothly melted and, therefore, the pellet feedability is reduced. The conjugated polyene present in the near-surface portions of the pellets supposedly increases frictional forces occurring between the pellets to reduce the feedability.

The inventors further conducted studies on the formability of the EVOH pellets by considering the incorporation of the conjugated polyene to the near-surface portions of the EVOH pellets, and the incorporation of an alkali earth metal to the EVOH pellets. As a result, it was confirmed that the EVOH pellets containing a predetermined amount of the alkali earth metal improves the feedability, and suppresses the abnormal noises. It was also found that, where the predetermined amount of the alkali earth metal is incorporated to the EVOH pellets having a higher conjugated polyene concentration in the surface portions of the pellets, the formability is improved.

It was found that, where the alkali earth metal is contained in excess in the conjugated polyene-containing EVOH pellets, on the other hand, draw resonance is liable to occur to reduce the formability. A mechanism for the occurrence of the draw resonance is not clarified. It is known that, when the EVOH contacts the high-temperature metal portions of the extruder, molecules of the EVOH are liable to be cut to generate radicals, but the conjugated polyene traps the radicals to prevent the cut molecular chains of the EVOH from being crosslinked with each other and, therefore, the EVOH has a lower molecular weight and hence a lower viscosity, and that the melt viscosity of the alkali earth metal-containing EVOH is reduced with time. Where the alkali earth metal is contained in excess in the conjugated polyene-containing EVOH pellets, the draw resonance occurs supposedly because the melt tension is reduced due to the reduction in melt viscosity by the alkali earth metal and the reduction in viscosity by the conjugated polyene.

According to a first aspect of the present disclosure, EVOH pellets are provided which contain an EVOH, a conjugated polyene, and 1 to 200 ppm of an alkali earth metal based on the weight of the pellets (hereinafter sometimes referred to as "conjugated polyene- and alkali earth metal-containing EVOH pellets"), wherein pellet surface portions of the EVOH pellets have a conjugated polyene content of not lower than 30 ppb based on the weight of the pellets.

According to a second aspect of the present disclosure, a method for producing the conjugated polyene- and alkali earth metal-containing EVOH pellets of the first aspect is provided, which includes the steps of: bringing pellets of an EVOH into contact with a treatment liquid containing a conjugated polyene; and bringing the pellets of the EVOH into contact with an alkali earth metal.

The conjugated polyene- and alkali earth metal-containing EVOH pellets of the present disclosure have a conjugated polyene content of not lower than 30 ppb based on the weight of the pellets in the pellet surface portions, and an alkali earth metal content of 1 to 200 ppm based on the weight of the pellets. Therefore, the conjugated polyene- and alkali earth metal-containing EVOH pellets are excellent in feedability and formability in the extruder. Further, the conjugated polyene- and alkali earth metal-containing EVOH pellets are excellent in fisheye-suppressing effect for suppressing the occurrence of fisheyes in a product melt-formed by using the conjugated polyene- and alkali earth metal-containing EVOH pellets.

Particularly, where the conjugated polyene- and alkali earth metal-containing EVOH pellets of the present disclosure have an overall conjugated polyene content of 0.1 to 10,000 ppm based on the weight of the pellets, the conjugated polyene- and alkali earth metal-containing EVOH pellets are better in fisheye-suppressing effect.

Particularly, where the weight-based content ratio (surface conjugated polyene content/overall conjugated polyene content) between the conjugated polyene content of the pellet surface portions and the overall conjugated polyene content of the conjugated polyene- and alkali earth metal-containing EVOH pellets of the present disclosure is not lower than $1.5 \times 10^{-5}$, the conjugated polyene- and alkali earth metal-containing EVOH pellets are still better in fisheye-suppressing effect.

Particularly, where the conjugated polyene is at least one selected from the group consisting of sorbic acid, a sorbic acid ester, and a sorbic acid salt in the present disclosure, the amount of the conjugated polyene adhering to the surfaces of the pellets of the EVOH can be more easily controlled.

In the conjugated polyene- and alkali earth metal-containing EVOH pellet production method of the present disclosure including the steps of bringing the pellets of the EVOH into contact with the treatment liquid containing the conjugated polyene, and bringing the pellets of the EVOH into contact with the alkali earth metal, the conjugated polyene- and alkali earth metal-containing EVOH pellets can be produced with the use of a conventional production facility.

Where the pellets of the EVOH are prepared by solidifying and pelletizing an alcohol solution or a water/alcohol mixed solution of the EVOH in the production method of the present disclosure, the pellets of the EVOH are porous.

Where the pellets of the EVOH are porous pellets of the EVOH in the production method of the present disclosure, the conjugated polyene can be efficiently incorporated to the surface portions of the pellets of the EVOH.

Where the production method of the present disclosure further includes an EVOH preparation step of adding the conjugated polyene as a polymerization inhibitor to an ethylene-vinyl ester copolymer and then saponifying the ethylene-vinyl ester copolymer to prepare the EVOH, the fisheyes are substantially prevented from occurring in a film melt-formed from the resulting conjugated polyene- and alkali earth metal-containing EVOH pellets.

DESCRIPTION OF EMBODIMENTS

Preferred embodiments of the present disclosure will hereinafter be described in detail. It should be understood that these preferred embodiments are illustrative but not limitative.

The conjugated polyene content of the pellet surface portions of the conjugated polyene- and alkali earth metal-containing EVOH pellets of the present disclosure is not lower than 30 ppb based on the weight of the pellets, and the alkali earth metal content of the conjugated polyene- and alkali earth metal-containing EVOH pellets of the present disclosure is 1 to 200 ppm based on the weight of the pellets.

The term "the conjugated polyene content of the pellet surface portions" herein means the amount of the conjugated polyene present in the near-surface portions of the conjugated polyene- and alkali earth metal-containing EVOH pellets and, more specifically, a conjugated polyene content determined by dissolving 20 g of the conjugated polyene- and alkali earth metal-containing EVOH pellets in 30 mL of a mixed liquid having a distilled water/methanol volume ratio of 1/1 with stirring for 10 minutes, analyzing the resulting solution by liquid chromatography to measure the amount of the conjugated polyene contained in the solution, and then dividing the thus measured conjugated polyene amount by the weight (20 g) of the EVOH pellets.

In the present disclosure, the term "alkali earth metal content" means the amount of the alkali earth metal contained in the surfaces of the conjugated polyene- and alkali earth metal-containing EVOH pellets and/or within the conjugated polyene- and alkali earth metal-containing EVOH pellets. More specifically, where the alkali earth metal is contained only in the EVOH pellet surfaces, the alkali earth metal amount of an alkali earth metal compound added to the EVOH pellet surfaces may be regarded as the alkali earth metal content. Where the alkali earth metal is contained within the EVOH pellets, the alkali earth metal content is determined, for example, by ashing the conjugated polyene- and alkali earth metal-containing EVOH pellets in a dry state, dissolving the resulting ash in an hydrochloric acid aqueous solution, analyzing the resulting hydrochloric acid aqueous solution by means of an inductively coupled plasma emission spectrometer (ICP-AES), fitting the result of the analysis to a calibration line prepared by using standard solutions to determine an alkali earth metal amount, and converting the alkali earth metal amount to the overall alkali earth metal content of the conjugated polyene- and alkali earth metal-containing EVOH pellets.

Prior to description of the conjugated polyene- and alkali earth metal-containing EVOH pellets of the present disclosure, formulation ingredients of the EVOH pellets, and a method of preparing pellets of the EVOH before incorporating the conjugated polyene and the alkali earth metal to the pellets of the EVOH will be described.

EVOH

The EVOH for the conjugated polyene- and alkali earth metal-containing EVOH pellets of the present disclosure is typically a resin prepared by saponifying a copolymer of ethylene and a vinyl ester monomer (ethylene-vinyl ester copolymer), or a water-insoluble thermoplastic resin generally referred to as an ethylene-vinyl alcohol copolymer or a saponified ethylene-vinyl ester copolymer.

Vinyl acetate is typically used as the vinyl ester monomer because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl ester monomers may be typically each used alone but, as required, may be used in combination.

Ethylene and the vinyl ester monomer described above are typically prepared by using a material derived from petroleum such as naphtha. Monomers prepared from materials derived from natural gas such as shale gas, and plant-derived materials such as obtained by refining sugar and starch contained in sugar cane, sugar beet, corn, potato, and the like, and cellulose contained in rice, wheat, millet, grass, and the like are also usable.

The EVOH to be used in the present disclosure may be prepared by copolymerization of the aforementioned monomers with any of the following comonomers (hereinafter referred to as "other comonomer") to be added in an amount (e.g., not greater than 10 mol %) that does not impair the effects of the present disclosure.

The other comonomers include: olefins such as propylene, 1-butene, and isobutene; hydroxyl-containing α-olefins such as 3-buten-1-ol, 3-butene-1,2-diol, 4-penten-1-ol, and 5-hexene-1,2-diol, and esterification products, acylation products, and other derivatives of these hydroxyl-containing α-olefins; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids having a carbon number of 1 to 18; acrylamide compounds such as acrylamide, N-alkyl acrylamides having a carbon number of 1 to 18, N,N-dimethyl acrylamide, 2-acrylamidopropane sulfonic acid and its salts, and acrylamidopropyldimethylamine and its acid salts and quaternary salts; methacrylamide compounds such as methacrylamide, N-alkyl methacrylamides having a carbon number of 1 to 18, N,N-dimethyl methacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers having a carbon number of 1 to 18; halogenated vinyl compounds such as vinyl chloride, vinylidene chloride, vinyl fluoride, vinylidene fluoride, and vinyl bromide; vinylsilanes such as trimethoxyvinylsilane; allyl acetate and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

A known polymerization method such as solution polymerization method, suspension polymerization method, emulsion polymerization method or bulk polymerization method may be utilized for the copolymerization of ethylene, the vinyl ester monomer, and the optional other comonomer. The solution polymerization method is preferably used from the viewpoint of homogenous dispersion. The polymerization may be carried out on a continuous basis or on a batch basis.

In the solution polymerization method, a solution containing the vinyl ester monomer, a solvent, and a polymerization catalyst is fed into a polymerization can, and the polymerization is allowed to proceed by feeding ethylene into the polymerization can with pressure while heating and stirring the solution. The pressure of ethylene is typically about 20 to about 80 kg/cm$^2$.

An alcohol is preferred as the solvent. Other examples of the solvent include organic solvents (dimethyl sulfoxide and the like) in which ethylene, vinyl acetate, and the ethylene-vinyl acetate copolymer are soluble. Examples of the alcohol include C1 to C10 aliphatic alcohols such as methanol, ethanol, propanol, n-butanol, and t-butanol. These solvents may be used alone or in combination. Among these, methanol is particularly preferred.

The catalyst to be used for the solution polymerization method is not particularly limited, as long as it is a radical initiator. Initiators such as azonitrile initiators and organic peroxide initiators are usable as the catalyst, and preferred examples of the initiators include: azo compounds such as 2,2'-azobis-(2,4-dimethylvaleronitrile), 2,2'-azobis-(2,4,4-trimethylvaleronitrile), 2,2'-azobisisobutyronitrile, 2,2'-azobis-(4-methoxy-2,4-dimethylvaleronitrile), and 2,2'-azobis-(2-methyl isobutyrate); alkyl peresters such as t-butyl peroxyneodecanoate, t-butyl perpivalate, and t-butylperoxy-2-ethyl hexanoate; peroxydicarbonates such as bis-(4-t-butylcyclohexyl) peroxydicarbonate, dicyclohexyl peroxydicarbonate, bis-(2-ethylhexyl) peroxydicarbonate, di-sec-butyl peroxydicarbonate, and diisopropyl peroxydicarbonate; and peroxides such as acetyl peroxide, benzoyl peroxide, lauroyl peroxide, dilauroyl peroxide, didecanoyl peroxide, dioctanoyl peroxide, and dipropyl peroxide. These may be used alone or in combination. Where a catalyst having a short half-life is used in the batch-based polymerization method, the catalyst cannot be fed on a batch basis, but should be continuously fed to the polymerization can.

The polymerization temperature is typically 20° C. to 90° C., preferably 40° C. to 70° C. The polymerization period is typically 2 to 15 hours, preferably 3 to 11 hours. In the continuous polymerization method, the polymerization period is preferably substantially the same as an average retention time during which the solution is retained in the polymerization can.

In the solution polymerization method, the polymerization is terminated when a predetermined polymerization degree is reached. The polymerization degree is typically 10 to 90 mol %, preferably 30 to 80 mol %, based on the molar amount of the fed vinyl ester monomer. Further, a solution obtained after the polymerization typically has a resin content of 5 to 85 wt. %, preferably 20 to 70 wt. %.

For the termination of the polymerization, a polymerization inhibitor is generally added. Examples of the polymerization inhibitor include N,N-dialkylhydroxylamine, styrene derivative, hydroquinone derivative, quinone derivative, piperidine derivative, and conjugated polyene, which may be used alone or in combination. Among these, the conjugated polyene is preferably used. The conjugated polyene may finally remain in a predetermined amount in the surface portions of the pellets to serve for the suppression of the occurrence of the fisheyes and the like.

Compounds shown below as the conjugated polyene may be used as the polymerization inhibitor.

For the homogenous dispersion, the conjugated polyene to be used as the polymerization inhibitor is preferably added in the form of a conjugated polyene solution prepared by dissolving the conjugated polyene in the same solvent as used for the polymerization.

Where the conjugated polyene is used as the polymerization inhibitor, the amount of the conjugated polyene to be added is typically 0.0001 to 3 parts by weight, preferably 0.0005 to 1 part by weight, more preferably 0.001 to 0.5 parts by weight, based on 100 parts by weight of the fed vinyl ester monomer.

After the completion of the polymerization, unreacted ethylene gas and unreacted vinyl ester monomer are removed from the resulting ethylene-vinyl ester copolymer solution, which is in turn subjected to saponification.

The unreacted ethylene gas can be removed, for example, by evaporation. An exemplary method to be used for removing the unreacted vinyl ester monomer from the ethylene-vinyl ester copolymer solution includes the steps of: continuously feeding the ethylene-vinyl ester copolymer solution at a constant rate from an upper portion of a column filled with Raschig rings; introducing vapor of an organic solvent such as methanol from a lower portion of the column to allow a mixed vapor including the organic solvent (methanol) and the unreacted vinyl ester monomer to flow out from the top of the column; and taking out the resulting ethylene-vinyl ester copolymer solution free from the unreacted vinyl ester monomer from the bottom of the column.

The saponification may be carried out by a known method. Typically, a saponification reaction is started by adding a saponification catalyst to the ethylene-vinyl ester copolymer solution free from the unreacted vinyl ester monomer.

The saponification may be carried out on a continuous basis or on a batch basis.

Examples of the saponification catalyst include alkali catalysts such as sodium hydroxide, potassium hydroxide, and alkali metal alcoholates.

Saponification conditions vary depending on the saponification catalyst to be used, the ethylene structural unit content of the ethylene-vinyl ester copolymer, and an intended saponification degree. For example, preferred saponification conditions for the batch-based saponification are as follows.

The saponification reaction temperature is 30° C. to 60° C., and the use amount of the saponification catalyst is typically 0.001 to 0.6 equivalents per equivalent of vinyl ester group. The saponification period is typically selected from a range of 1 to 6 hours, depending on the saponification conditions and the intended saponification degree.

Thus, an EVOH solution or slurry is prepared. The EVOH solution or slurry preferably has an EVOH content of about 10 to about 50 wt. %. The EVOH content of the EVOH solution or slurry may be adjusted by using a solvent. An alcohol such as methanol, or a water/alcohol mixed solvent is preferably used as the solvent.

The EVOH to be used in the present disclosure may be a post-modified EVOH such as an urethanized, acetalized, cyanoethylated or oxyalkylenated EVOH.

The EVOH thus prepared mainly contains an ethylene-derived structural unit and a vinyl alcohol structural unit, and further contains a small amount of a vinyl ester structural unit left unsaponified as required. Where the other comonomer is used for the copolymerization, the EVOH further contains a structural unit derived from the other comonomer.

The EVOH to be used in the present disclosure preferably has the following formulation.

The EVOH typically has an ethylene structural unit content of 20 to 60 mol %, preferably 25 to 50 mol %, as measured in conformity with ISO14663. If the ethylene structural unit content is excessively low, the EVOH tends to be poorer in high-humidity gas barrier property and melt formability. If the ethylene structural unit content is excessively high, on the other hand, the EVOH tends to be poorer in gas barrier property.

The saponification degree of the vinyl ester component in the EVOH is typically 90 to 100 mol %, preferably 95 to 100 mol %, as measured in conformity with JIS K6726 (by using a solution prepared by homogeneously dissolving the EVOH in a water/methanol solvent). If the saponification degree is excessively low, the EVOH tends to be poorer in gas barrier property, heat stability, moisture resistance, and the like.

Conjugated Polyene

The conjugated polyene to be used in the present disclosure is a compound containing so-called conjugated double bonds, i.e., having a structure such that carbon-carbon double bonds and carbon-carbon single bonds are alternately connected to each other and the number of the carbon-carbon double bonds is two or more. The conjugated polyene may be a conjugated diene having a structure such that two carbon-carbon double bonds and one carbon-carbon single bond are alternately connected to each other, a conjugated triene having a structure such that three carbon-carbon double bonds and two carbon-carbon single bonds are alternately connected to each other, or a conjugated polyene having a structure such that more than three carbon-carbon double bonds and more than two carbon-carbon single bonds are alternately connected to each other. However, a conjugated polyene having eight or more conjugated carbon-carbon double bonds is colored, so that a product formed from an EVOH containing such a conjugated polyene is liable to be colored. Therefore, a conjugated polyene having seven or less conjugated carbon-carbon double bonds is preferred. The conjugated polyene may have a structure such that plural sets of conjugated double bonds each including two or more carbon-carbon double bonds are present in an unconjugated state in its molecule. Tung oil containing three conjugated trienes in its molecule is also an example of the conjugated polyene.

Examples of the conjugated polyene include: conjugated dienes, such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid esters, sorbic acid salts, and abietic acid, each having a conjugated structure containing two carbon-carbon double bonds; conjugated trienes, such as 1,3,5-hexatriene, 2,4,6-octatriene-1-carboxylic acid, eleostearic acid, tung oil, and cholecalciferol, each having a conjugated structure containing three carbon-carbon double bonds; and conjugated polyenes, such as cyclooctatetraene, 2,4,6,8-decatetraene-1-carboxylic acid, retinol, and retinoic acid, each having a conjugated structure containing four or more carbon-carbon double bonds. Of these, 1,3-pentadiene, myrcene, and farnesene each have a plurality of stereoisomers, which are all usable. These conjugated polyenes may be used alone or in combination.

Of these, sorbic acid, the sorbic acid esters, and the sorbic acid salts, which each have a carboxyl group and hence have higher water affinity, are particularly preferred, because the amount of the conjugated polyene adhering to the EVOH pellet surfaces can be easily controlled.

Alkali Earth Metal

Examples of the alkali earth metal to be used in the present disclosure include beryllium, magnesium, calcium, strontium, barium, and radium, which may be used alone or in combination. Of these, magnesium is preferred.

Exemplary alkali earth metal sources for incorporating the alkali earth metal to the conjugated polyene- and alkali earth metal-containing EVOH pellets of the present disclosure include alkali earth metal compounds such as alkali earth metal oxides, alkali earth metal hydroxides, and alkali earth metal salts. Particularly, the alkali earth metal salts are preferred for dispersibility. The alkali earth metal compounds to be used in the present disclosure preferably exclude inorganic lamellar compounds and double salts from the viewpoint of economy and dispersibility.

Examples of the alkali earth metal salts include: inorganic salts such as carbonates, hydrogen carbonates, phosphates, borates, sulfates, and chlorides of the alkali earth metals; and organic acid salts including C2 to C11 monocarboxylates such as acetates, butyrates, propionates, enanthates, and caprates of the alkali earth metals, C2 to C11 dicarboxylates such as oxalates, malonates, succinates, adipates, suberates, and sebacates of the alkali earth metals, and monocarboxylates having a carbon number of not less than 12 such as laurates, palmitates, stearates, 12-hydroxystearates, behenates, and montanates of the alkali earth metals. These may be used alone or in combination. Of these, the phosphates of the alkali earth metals are preferred. Where plural types of alkali earth metals are used, the alkali earth metal content is the total amount of the alkali earth metals.

Other Ingredients

The conjugated polyene- and alkali earth metal-containing EVOH pellets of the present disclosure may contain a resin composition prepared by mixing a resin, other than the EVOH, generally used for an EVOH composition in an amount (e.g., not greater than 20 wt. %, preferably not greater than 10 wt. %) that does not impair the effects of the present disclosure.

As required, the conjugated polyene- and alkali earth metal-containing EVOH pellets of the present disclosure may contain additives that are generally added to the EVOH. Examples of the additives include heat stabilizer, antioxidant, antistatic agent, colorant, UV absorber, lubricant, plasticizer, light stabilizer, surfactant, antibacterial agent, drying agent, anti-blocking agent, flame retardant, crosslinking agent, curing agent, foaming agent, nucleating agent, anti-fogging agent, biodegradation agent, silane coupling agent, oxygen absorber, filler, and reinforcing material such as fibers. Particularly, an acid or a partial salt of a polybasic acid such as phosphoric acid, pyrophosphoric acid, phosphorous acid, oxalic acid, succinic acid, adipic acid, tartaric acid, citric acid, dihydrogen sodium phosphate, dihydrogen potassium phosphate, or acetic acid may be contained in the conjugated polyene- and alkali earth metal-containing EVOH pellets. These may be used alone or in combination.

Preparation of Pellets of EVOH

A conventionally known method may be used for the preparation of pellets from the EVOH. Examples of the method include:

a) a hot cutting method including the steps of extruding the EVOH in a fluid state from an extrusion head of an extruder, cutting the extruded EVOH in a melted state, and cooling and solidifying the resulting pieces of the extruded EVOH into pellets; and b) a strand cutting method including the steps of extruding the EVOH in a fluid state into a solidification bath, cooling and solidifying the extruded EVOH, and cutting the resulting EVOH strands.

For preparation of porous pellets to be described later, the strand cutting method (b) is preferred.

The EVOH to be used as a material for the pellets in the hot cutting method (a) and the strand cutting method (b) described above may be:

(α) an EVOH solution or slurry or an EVOH hydrous composition (hereinafter sometimes referred to as "EVOH solution/hydrous composition") prepared by the saponification in the EVOH preparation process; or (β) a melted-state EVOH prepared by melting the pellets of the EVOH (dry EVOH composition).

The EVOH hydrous composition is prepared by properly adjusting the water content of the EVOH solution or slurry with the use of water or a solvent. The EVOH hydrous composition has an EVOH concentration of 20 to 60 wt. %.

Usable examples of the solvent include alcohol, and water/alcohol mixed solvent. Particularly, the water/alcohol mixed solvent is preferred. Usable examples of the alcohol include C1 to C10 aliphatic alcohols such as methanol, ethanol, propanol, n-butanol, and t-butanol. Particularly, methanol is preferred. The water/alcohol mixing weight ratio is preferably 80/20 to 5/95.

The EVOH hydrous composition preferably contains 0 to 10 parts by weight of the alcohol and 10 to 500 parts by weight of water based on 100 parts by weight of the EVOH.

The method of adjusting the water content of the EVOH solution or slurry is not particularly limited. Exemplary methods for increasing the water content include: a method in which the solvent is sprayed over the EVOH solution or slurry; a method in which the EVOH solution or slurry is mixed with the solvent; and a method in which the EVOH solution or slurry is brought into contact with vapor of the solvent. The water content may be reduced by properly drying the EVOH solution or slurry, for example, by a hot air dryer of fluidized type or a hot air dryer of stationary type.

Next, the hot cutting method (a) and the strand cutting method (b) will be described.

a) Hot Cutting Method

Where the EVOH solution/hydrous composition is fed as the pellet material into the extruder, the temperature of the EVOH solution/hydrous composition in the extruder is preferably 70° C. to 170° C., more preferably 80° C. to 170° C., still more preferably 90° C. to 170° C. If the temperature of the EVOH solution/hydrous composition is excessively low, it will be difficult to completely melt the EVOH. If the temperature of the EVOH solution/hydrous composition is excessively high, the EVOH is susceptible to thermal degradation.

Where the dry EVOH composition is fed as the pellet material into the extruder, the temperature of the dry EVOH composition in the extruder is preferably 150° C. to 300° C., more preferably 160° C. to 280° C., still more preferably 170° C. to 250° C.

The temperature of the EVOH solution/hydrous composition and the temperature of the dry EVOH composition are each defined as a temperature detected around the extrusion head provided at the distal end of the extruder by means of a temperature sensor disposed in the cylinder of the extruder.

The EVOH solution/hydrous composition or the dry EVOH composition extruded from the die of the extruder, i.e., the melted-state EVOH, is cut before being cooled and solidified. Exemplary cutting methods include: an in-air hot cutting method in which the extruded EVOH is cut in air; and an in-water cutting method in which the EVOH is extruded in a container filled with cooling water (cooling liquid) and provided with a cutter, and cut in the cooling water.

In the in-water cutting method, the temperature of the cooling water (cooling liquid) is such that the EVOH extruded in the melted state is not instantly hardened (solidified). Where the EVOH solution/hydrous composition is used as the material, the temperature of the cooling water (cooling liquid) is preferably −20° C. to 50° C., more preferably −5° C. to 30° C.

Where the dry EVOH composition is used as the material, the EVOH composition is more easily solidified than in the case where the EVOH solution/hydrous composition is used as the material. Therefore, the temperature of the cooling water in the in-water cutting method is higher than in the case where the EVOH solution/hydrous composition is used as the material, and is typically 0° C. to 90° C., preferably 20° C. to 70° C.

The cooling liquid is not limited to water, but other usable examples of the cooling liquid include: water/alcohol mixed solution; aromatic hydrocarbons such as benzene; ketones such as acetone and methyl ethyl ketone; ethers such as dipropyl ether; and organic esters such as methyl acetate, ethyl acetate, and methyl propionate. Of these, water or the water/alcohol mixed solution is used from the viewpoint of easy handling. The water/alcohol weight ratio of the water/alcohol mixed solution is typically 90/10 to 99/1. Usable examples of the alcohol include lower alcohols such as methanol, ethanol, and propanol. Of these, methanol is industrially preferred.

b) Strand Cutting Method

Where the EVOH solution/hydrous composition is fed as the pellet material into the extruder, the temperature of the EVOH to be extruded in the solidification bath is typically 10° C. to 100° C. The temperature of the solidification bath is such that the extruded EVOH can be cooled and solidified, and is typically −10° C. to 40° C. The retention time is typically about 10 to about 400 seconds.

Where the dry EVOH composition is fed as the pellet material into the extruder, the temperature of the EVOH to be extruded in the solidification bath is typically 150° C. to 300° C. The temperature of the solidification bath is typically 0° C. to 90° C., and the retention time is about 2 to about 400 seconds.

The same solution as described for the cooling liquid to be used in the hot cutting method (a) may be used as a solidification liquid for the solidification bath.

Thus, the pellets of the EVOH are prepared.

The pellets of the EVOH prepared in the aforementioned manner are preferably porous pellets from the viewpoint of a conjugated polyene incorporating process to be described later. The porous pellets can be prepared by using an EVOH alcohol solution or an EVOH water/alcohol solution (EVOH hydrous composition) as the pellet material in the strand cutting method (b). Where the pellets of the EVOH are porous, the conjugated polyene is infiltrated into pores of the pellets of the EVOH to be thereby easily retained in the pellets. Thus, the conjugated polyene can be efficiently incorporated to the pellet surface portions. The size of the pores of the porous pellets is not particularly limited, as long as the conjugated polyene can be infiltrated into the pores.

The shape of the pellets of the EVOH generally depends upon the pellet preparation method, and may be any of various shapes. The pellets of the EVOH prepared by the aforementioned methods and the conjugated polyene- and alkali earth metal-containing EVOH pellets of the present disclosure may have any desired shape. The pellets may each have, for example, spherical shape, oval shape, cylindrical shape, cubic shape, square prism shape, irregular shape, or the like, and typically the oval shape or the cylindrical shape. The oval pellets typically each have a major diameter of 1 to 10 mm and a minor diameter of 1 to 6 mm, preferably a major diameter of 2 to 7 mm and a minor diameter of 2 to 5 mm, and the cylindrical pellets typically each have a bottom diameter of 1 to 10 mm and a length of 1 to 10 mm, preferably a bottom diameter of 2 to 7 mm and a length of 3 to 8 mm, for easy handling thereof in subsequent use as a forming material.

The EVOH solution/hydrous composition to be used as the pellet material generally contains the alkali catalyst used for the saponification, by-produced salts, and other impurities. Accordingly, the pellets of the EVOH prepared by using the EVOH solution/hydrous composition as the pellet material generally contain the aforementioned impurities. Therefore, the porous pellets thus prepared may be rinsed with water.

Where the pellets of the EVOH prepared by using the conjugated polyene as the polymerization inhibitor in the aforementioned EVOH preparation process are rinsed with water, the conjugated polyene is also removed. However, the removability of the conjugated polyene varies depending upon the polarity and the like of the conjugated polyene, so that a certain amount of the conjugated polyene remains in the pellets of the EVOH.

Production of Conjugated Polyene- and Alkali Earth Metal-Containing EVOH Pellets The conjugated polyene- and alkali earth metal-containing EVOH pellets of the present disclosure are produced by performing a production process for conjugated polyene-containing EVOH pellets and a production process for alkali earth metal-containing EVOH pellets to be described below. These processes may be simultaneously performed, or one of the processes may precede or follow the other process. Where these processes are simultaneously performed, a solution containing the conjugated polyene and the alkali earth metal dissolved therein may be used as a treatment liquid for the processes.

Particularly, it is preferred, in terms of working efficiency, to first perform the conjugated polyene-containing EVOH pellet production process and then the alkali earth metal-containing EVOH pellet production process.

Production of Conjugated Polyene-Containing EVOH Pellets

The conjugated polyene-containing EVOH pellets can be produced by incorporating the conjugated polyene to the surfaces of the pellets of the EVOH.

Exemplary methods for incorporating the conjugated polyene to the EVOH pellet surfaces include: a method in which the pellets of the EVOH preliminarily prepared are brought into contact with the conjugated polyene; and a method in which the conjugated polyene is incorporated to the pellets of the EVOH in the EVOH pellet preparation process.

As described above, the conjugated polyene can be used as the polymerization inhibitor. Therefore, the conjugated polyene-containing EVOH pellets can be produced by adding the conjugated polyene as the polymerization inhibitor at the end of the polymerization. However, the conjugated polyene is generally uniformly present in the entire EVOH pellets prepared by this method, so that the surface portions of the EVOH pellets are liable to have a lower conjugated polyene content. If the amount of the conjugated polyene to be added as the polymerization inhibitor is increased, the coloration of the pellets will result. Therefore, the pellets often need to be rinsed with water after the preparation thereof. This generally makes it difficult to control the conjugated polyene content of the pellet surface portions to a level ensuring the fisheye-suppressing effect in the EVOH pellet preparation process.

Therefore, the method in which the pellets of the EVOH preliminarily prepared are brought into contact with the conjugated polyene is preferred for incorporating the conjugated polyene to the surface portions of the EVOH pellets.

In an exemplary method for bringing the preliminarily prepared EVOH pellets into contact with the conjugated polyene, the EVOH pellets are preferably brought into contact with a treatment liquid containing the conjugated polyene (hereinafter sometimes referred to as "conjugated polyene-containing treatment liquid"). In another exemplary contact method, the conjugated polyene may be directly added to and mixed with the EVOH pellets.

Examples of the method for bringing the EVOH pellets into contact with the conjugated polyene-containing treatment liquid include: a method in which the conjugated polyene-containing treatment liquid is sprayed over the EVOH pellets; a method in which the EVOH pellets are immersed in the conjugated polyene-containing treatment liquid; a method in which the EVOH pellets are rinsed with the conjugated polyene-containing treatment liquid; and a solution coating method in which the surfaces of the EVOH pellets are controlled at a predetermined high temperature and coated with the conjugated polyene-containing treatment liquid by spraying the conjugated polyene-containing treatment liquid over the EVOH pellets. Of these, the method in which the EVOH pellets are immersed in the conjugated polyene-containing treatment liquid, and the method in which the EVOH pellets are rinsed with the conjugated polyene-containing treatment liquid are preferably used.

The method for bringing the EVOH pellets into contact with the conjugated polyene-containing treatment liquid makes it possible to efficiently increase the conjugated polyene content of the EVOH pellet surface portions. Further, this method is advantageous in that the conjugated polyene content of the pellet surface portions can be precisely controlled by adjusting the conjugated polyene concentration of the treatment liquid.

In the conjugated polyene incorporating process to be performed by bringing the EVOH pellets into contact with the conjugated polyene-containing treatment liquid, the concentrations of other preferred additives, particularly, the concentrations of acetic acid, an acetic acid salt (excluding alkali earth metal salts), and a boron-containing compound (e.g., boric acid), may be adjusted. More specifically, a treatment liquid containing acetic acid, the acetic acid salt (excluding the alkali earth metal salts), the boron-containing compound (e.g., boric acid), and other additives in addition to the conjugated polyene may be used. This method makes it easy to adjust the content ratios of the other additives to the conjugated polyene.

The conjugated polyene concentration of the conjugated polyene-containing treatment liquid is typically 0.01 to 500 ppm, preferably 0.1 to 50 ppm, based on the weight of the conjugated polyene-containing treatment liquid. If the conjugated polyene concentration is excessively low, it will be difficult to incorporate the predetermined amount of the conjugated polyene to the EVOH pellets. If the conjugated polyene concentration is excessively high, the conjugated polyene is liable to deposit on the pellet surfaces to agglomerate in the form of blobs in a film formed from the conjugated polyene-containing EVOH pellets.

The conjugated polyene content of the surface portions may be controlled by changing the conjugated polyene concentration of the conjugated polyene-containing treatment liquid, the period of the contact process, the temperature for the contact process, the stirring speed in the contact process, the water content of the pellets of the EVOH to be subjected to the contact process, and the like.

The pellets of the EVOH subjected to the conjugated polyene contact process may be used as they are in the subsequent step, but are generally preferably dried. A known drying method may be employed for the drying. Examples of the known drying method include a fluidized drying method using drum/groove type agitation dryer, round pipe dryer, rotary dryer, fluid bed dryer, vibrating fluid bed dryer or conical rotor type dryer, and a stationary drying method using batch box type dryer, band dryer, tunnel dryer or vertical silo dryer. The conjugated polyene-containing EVOH pellets can be efficiently dried by passing gas such as nitrogen gas at 80° C. to 150° C. through the dryer.

Thus, the conjugated polyene-containing EVOH pellets are produced.

Production of Alkali Earth Metal-Containing EVOH Pellets

The alkali earth metal-containing EVOH pellets can be produced by incorporating the alkali earth metal to the pellets of the EVOH.

In an exemplary method for incorporating the alkali earth metal to the pellets of the EVOH, the pellets of the EVOH preliminarily prepared are preferably brought into contact with the alkali earth metal. In another exemplary method, the alkali earth metal may be incorporated to the pellets of the EVOH by bringing the EVOH into contact with the alkali earth metal in the EVOH pellet preparation process.

Examples of the method for bringing the preliminarily prepared EVOH pellets into contact with the alkali earth metal include: a method in which an alkali earth metal-containing treatment liquid is sprayed over the EVOH pellets; a method in which the EVOH pellets are immersed in the alkali earth metal-containing treatment liquid; a method in which the EVOH pellets are fed into the alkali earth metal-containing treatment liquid with stirring; and a method in which a powdery alkali earth metal compound is directly added to and mixed with the EVOH pellets. Of these, the method in which the powdery alkali earth metal compound is directly added to and mixed with the EVOH pellets is preferred for efficient incorporation of the alkali earth metal.

Where the powdery alkali earth metal compound is directly added to the EVOH pellets, the alkali earth metal amount of the alkali earth metal compound added to the EVOH pellet surfaces may be regarded as the alkali earth metal content. The amount of the alkali earth metal compound to be added is typically 1 to 200 ppm, preferably 5 to 100 ppm, particularly preferably 10 to 50 ppm, on an alkali earth metal basis based on the weight of the pellets of the EVOH. If the alkali earth metal content is excessively low, the EVOH pellets tend to be poorer in feedability when being fed into the hopper of the extruder. If the alkali earth metal content is excessively high, the draw resonance is more liable to occur during the film formation.

Thus, the alkali earth metal-containing EVOH pellets are produced by the above process.

The conjugated polyene- and alkali earth metal-containing EVOH pellets of the present disclosure can be produced by performing the conjugated polyene incorporating process and the alkali earth metal incorporating process described above.

Conjugated Polyene- and Alkali Earth Metal-Containing EVOH Pellets

The conjugated polyene content of the surface portions of the conjugated polyene- and alkali earth metal-containing EVOH pellets of the present disclosure is typically not lower than 30 ppb, preferably not lower than 34 ppb, more preferably not lower than 38 ppb, based on the weight of the pellets. Where the conjugated polyene content of the pellet surface portions is not lower than the aforementioned level, the occurrence of minute fisheyes each having a diameter of not greater than 200 μm can be effectively suppressed. If the conjugated polyene content of the surface portions is lower, a greater number of fisheyes are liable to occur. The upper limit of the conjugated polyene content of the surface portions is typically 10,000 ppb (10 ppm), preferably 8,000 ppb (8 ppm), particularly preferably 5,000 ppb (5 ppm), especially preferably 1,000 ppb (1 ppm).

As described above, the conjugated polyene content of the surface portions is determined by dissolving 20 g of the conjugated polyene- and alkali earth metal-containing EVOH pellets in 30 mL of a mixed liquid having a water/methanol volume ratio of 1/1 with stirring at 20° C. for 10 minutes, analyzing the resulting solution by liquid chromatography to measure the amount of the conjugated polyene contained in the solution, and then dividing the thus measured conjugated polyene amount by the weight (20 g) of the EVOH pellets.

The conjugated polyene- and alkali earth metal-containing EVOH pellets of the present disclosure are at least required to have a conjugated polyene content of not lower than 30 ppb based on the weight of the pellets in the pellet surface portions thereof as determined by the aforementioned measurement method. This means that the conjugated polyene may be almost absent in inner portions of the conjugated polyene- and alkali earth metal-containing EVOH pellets, or that a greater amount of the conjugated polyene may be present in the inner portions of the pellets.

Where the conjugated polyene is added as the polymerization inhibitor in the EVOH preparation process and the resulting EVOH solution/hydrous composition is used as the pellet material, for example, the pellet inner portions tend to have a higher conjugated polyene content.

Where the conjugated polyene is also present in the inner portions of the conjugated polyene- and alkali earth metal-containing EVOH pellets, the overall conjugated polyene content of the conjugated polyene- and alkali earth metal-containing EVOH pellets is typically 0.1 to 10,000 ppm, preferably 0.5 to 8,000 ppm, more preferably 1 to 5,000 ppm, particularly preferably 1 to 2,000 ppm, especially preferably 1 to 800 ppm, based on the weight of the pellets. If the overall conjugated polyene content is excessively low, the conjugated polyene content of the pellet surface portions will be relatively reduced, resulting in a greater number of fisheyes. If the overall conjugated polyene content is excessively high, a product formed from the conjugated polyene- and alkali earth metal-containing EVOH pellets is liable to be colored due to the color of the conjugated polyene.

The term "overall conjugated polyene content" means the amount of the conjugated polyene contained in the conjugated polyene- and alkali earth metal-containing EVOH pellets, more specifically, a conjugated polyene content determined by pulverizing the conjugated polyene- and alkali earth metal-containing EVOH pellets, extracting the conjugated polyene from the pulverized pellets with the use of a solvent, analyzing the resulting extraction solvent by liquid chromatography to measure the amount of the conjugated polyene contained in the extraction solvent, and converting the measurement value.

The weight-based content ratio (surface conjugated polyene content/overall conjugated polyene content) between the conjugated polyene content of the pellet surface portions of the conjugated polyene- and alkali earth metal-containing EVOH pellets and the overall conjugated polyene content of the conjugated polyene- and alkali earth metal-containing EVOH pellets is typically not lower than $1.5 \times 10^{-5}$, preferably not lower than $3 \times 10^{-5}$, more preferably not lower than $5 \times 10^{-5}$, particularly preferably not lower than $1.5 \times 10^{-4}$, especially preferably not lower than $2 \times 10^{-4}$. If the weight-based content ratio between the conjugated polyene content of the pellet surface portions and the overall conjugated polyene content of the pellets is excessively low, the conjugated polyene- and alkali earth metal-containing EVOH pellets tend to be poorer in fisheye-suppressing effect. The upper limit of the weight-based content ratio is typically $1 \times 10^{-2}$.

The alkali earth metal content of the conjugated polyene- and alkali earth metal-containing EVOH pellets is typically 1 to 200 ppm, preferably 5 to 100 ppm, particularly preferably 10 to 50 ppm, based on the weight of the pellets. If the alkali earth metal content is excessively low, the conjugated polyene- and alkali earth metal-containing EVOH pellets are liable to be poorer in feedability when being fed into the hopper of the extruder. If the alkali earth metal content is excessively high, the draw resonance is liable to occur when a film is formed from the conjugated polyene- and alkali earth metal-containing EVOH pellets.

The term "alkali earth metal content" means the amount of the alkali earth metal contained in the surfaces of the conjugated polyene- and alkali earth metal-containing EVOH pellets and/or within the conjugated polyene- and alkali earth metal-containing EVOH pellets. More specifically, where the alkali earth metal is contained only in the surfaces of the conjugated polyene- and alkali earth metal-containing EVOH pellets, the alkali earth metal amount of the alkali earth metal compound added to the EVOH pellet surfaces may be regarded as the alkali earth metal content. Where the alkali earth metal is contained within the EVOH pellets, the alkali earth metal content is determined, for example, by ashing the conjugated polyene- and alkali earth metal-containing EVOH pellets in a dry state, dissolving the resulting ash in an hydrochloric acid aqueous solution, analyzing the resulting hydrochloric acid aqueous solution by means of an inductively coupled plasma emission spectrometer (ICP-AES), fitting the result of the analysis to a calibration line prepared by using standard solutions to determine an alkali earth metal amount, and converting the alkali earth metal amount to the overall alkali earth metal content of the conjugated polyene- and alkali earth metal-containing EVOH pellets.

The conjugated polyene- and alkali earth metal-containing EVOH pellets of the present disclosure typically have a water content of 0.01 to 1 wt. %, preferably 0.05 to 0.5 wt. %. If the water content is excessively low, it will be impossible to plasticize the EVOH by water molecules, so that the EVOH pellets cannot be easily melted in the extrusion. This tends to result in fisheyes caused by unmelted portions of the pellets. If the water content is excessively high, a foaming phenomenon is liable to occur in the extrusion, so that a product formed from the conjugated polyene- and alkali earth metal-containing EVOH pellets tends to be poorer in appearance.

The melt flow rate (MFR) of the conjugated polyene- and alkali earth metal-containing EVOH pellets is typically 0.5 to 100 g/10 minutes, preferably 1 to 50 g/10 minutes, particularly preferably 3 to 35 g/10 minutes, as measured at 210° C. with a load of 2160 g. If the MFR is excessively high, the film formability tends to be unstable. If the MFR is excessively low, the viscosity tends to be excessively high, making the extrusion difficult.

Use Applications

The conjugated polyene- and alkali earth metal-containing EVOH pellets of the present disclosure can be formed, for example, into films, sheets, cups, bottles, and the like by a melt-forming process. Examples of the melt-forming process include extrusion process (T-die extrusion, inflation extrusion, blowing, melt-spinning, profile extrusion, and the like), and injection molding process. The melt-forming temperature is typically selected from a range of 150° C. to 300° C. A film, a sheet, a fiber material or the like formed from the conjugated polyene- and alkali earth metal-containing EVOH pellets may be uniaxially or biaxially stretched.

The conjugated polyene- and alkali earth metal-containing EVOH pellets of the present disclosure may be used alone as they are in the melt-forming process, or may be blended with pellets of some other thermoplastic resin for use in the melt-forming process. Two or more types of conjugated polyene- and alkali earth metal-containing EVOH pellets may be used as a mixture. The two or more types of EVOH composition pellets to be used as the mixture may contain EVOHs having different ethylene structural unit contents, different saponification degrees, different MFRs, and different structures.

Examples of the other thermoplastic resin include polyolefins (e.g., polyethylenes, polypropylenes, poly(1-butene), poly(4-methyl-1-pentene), ethylene-propylene copolymers, copolymers of ethylene and α-olefin having a carbon number of 4 or more, copolymers of polyolefin and maleic anhydride, ethylene-vinyl acetate copolymers, ethylene-acrylate copolymers, polyolefins obtained by graft-modifying any of these polyolefins with an unsaturated carboxylic acid or a derivative of the unsaturated carboxylic acid, and the like), nylons (e.g., nylon-6, nylon-66, and nylon-6/66 copolymers, and the like), polyvinyl chlorides, polyvinylidene chlorides, polyesters, polystyrenes, polyacrylonitriles, polyurethanes, polyacetals, and modified polyvinyl alcohol resins.

Examples of the EVOH film formed from the conjugated polyene- and alkali earth metal-containing EVOH pellets of the present disclosure for practical applications include a single-layer EVOH film, and a multilayer structure including at least one EVOH film. The conjugated polyene- and alkali earth metal-containing EVOH pellets may be used for coextrusion coating or solution coating of a base film such as paper, plastic film or metal foil.

The multilayer structure will hereinafter be described.

For production of the multilayer structure, a layer formed by using the conjugated polyene- and alkali earth metal-containing EVOH pellets of the present disclosure is laminated with some other base material (a thermoplastic resin or the like) on one or both sides thereof. Exemplary laminating methods include: a laminating method in which the other base material is melt-extruded onto a film or a sheet formed by using the conjugated polyene- and alkali earth metal-containing EVOH pellets of the present disclosure; a laminating method in which the conjugated polyene- and alkali earth metal-containing EVOH pellets of the present disclosure or the like are melt-extruded onto the other base material; a method in which the conjugated polyene- and alkali earth metal-containing EVOH pellets of the present disclosure and the other base material are coextruded; and a method in which a film or a sheet (layer) formed by using the conjugated polyene- and alkali earth metal-containing EVOH pellets of the present disclosure and the other base material (layer) are dry-laminated together with the use of a known adhesive agent such as of organic titanium compound, isocyanate compound, polyester compound or polyurethane compound. The melt forming temperature for the melt extrusion is generally selected from a range of 150° C. to 300° C.

The thermoplastic resin is useful as the other base material. Specific examples of the thermoplastic resin include: olefin homopolymers and copolymers including polyethylenes such as linear low-density polyethylenes, low-density polyethylenes, very-low-density polyethylenes, medium-density polyethylenes, and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes, and polypentenes, and polyolefin resins in a broader sense such as obtained by graft-modifying any of these olefin homopolymers and copolymers with an unsaturated carboxylic acid or an unsaturated carboxylic acid ester; and polyester resins, polyamide resins (including polyamide copolymers), polyvinyl chlorides, polyvinylidene chlorides, acryl resins, polystyrene resins, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the EVOH to be used in the present disclosure. From the viewpoint of the practicality and the physical properties (particularly, the strength) of the multilayer structure, the polypropylenes, the ethylene-propylene (block or random) copolymers, the polyamide resins, the polyethylenes, the ethylene-vinyl acetate copolymers, the polystyrenes, polyethylene terephthalates (PET), and polyethylene naphthalates (PEN) are preferably used.

Where a product, such as a film or a sheet, formed by using the conjugated polyene- and alkali earth metal-containing EVOH pellets of the present disclosure is extrusion-coated with the other base material, or where the film or the sheet formed by using the conjugated polyene- and alkali earth metal-containing EVOH pellets of the present disclosure and a film, a sheet or the like of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material, and wood material.

Where layers a (a1, a2, . . . ) formed by using the conjugated polyene- and alkali earth metal-containing EVOH pellets of the present disclosure and layers b (b1, b2, . . . ) of the other base material (e.g., the thermoplastic resin) are laminated together to produce a multilayer structure having an innermost layer a, the layered configuration of the multilayer structure of the present disclosure is not limited to a double layer structure a/b (which means an inner layer/outer layer structure, and this definition also applies to the following description), but may be any combination of these layers, e.g., a/b/a, a1/a2/b, a/b1/b2, a1/b1/a2/b2, a1/b1/b2/a2/b2/b1, or the like. Where the multilayer structure further includes a regrind layer R formed of a mixture containing at least the conjugated polyene- and alkali earth metal-containing EVOH composition of the present disclosure and the thermoplastic resin, the layered configuration of the multilayer structure may be, for example, a/R/b, a/R/a/b, a/b/R/a/R/b, a/b/a/R/a/b, a/b/R/a/R/a/R/b, or the like.

In the aforementioned layered configuration, as required, an adhesive resin layer may be provided between the layers. Various adhesive resins are usable as an adhesive resin for the adhesive resin layer. Examples of the adhesive resin for providing a highly stretchable multilayer structure include olefin polymers modified as containing a carboxyl group by chemically bonding an unsaturated carboxylic acid or its anhydride to the olefin polymers (the aforementioned polyolefin resins in a broader sense) by an addition reaction, a graft reaction or the like.

Specific preferred examples of the modified olefin polymers containing the hydroxyl group include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, and ethylene-vinyl acetate copolymers graft-modified with maleic anhydride, which may be used alone or in combination as a mixture. In this case, the proportion of the unsaturated carboxylic acid or its anhydride to be contained in the modified olefin polymers is preferably 0.001 to 3 wt. %, more preferably 0.01 to 1 wt. %, particularly preferably 0.03 to 0.5 wt. %. If the modification degree of such a modification product is excessively low, the adhesiveness tends to be poorer. If the modification degree is excessively high, on the other hand, a crosslinking reaction tends to occur, thereby reducing the formability.

Further, the adhesive resin may be blended with the EVOH of the conjugated polyene- and alkali earth metal-containing EVOH pellets of the present disclosure, the other EVOH, a rubber/elastomer component such as polyisobutylene or ethylene propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend upon the layered configuration, the type of the layer b, the use purpose, the shape of the formed product, and the required physical properties. The thickness of the layer a is typically selected from a range of 5 to 500 μm, preferably 10 to 200 μm, and the thickness of the layer b is typically selected from a range of 10 to 5,000 μm, preferably 30 to 1,000 μm. The thickness of the adhesive resin layer is typically selected from a range of 5 to 400 μm, preferably about 10 to about 150 μm.

The multilayer structure may be used as it is in various forms. It is preferred to perform a heat stretching process on the multilayer structure for improvement of the physical properties of the multilayer structure. The term "heat stretching process" herein means a process in which a thermally uniformly heated laminate in the form of a film, a sheet or a parison is uniformly formed into a cup, a tray, a tube or a film with the use of a chuck, a plug, a vacuum force, a compressed air force, blowing means, or other forming means. The stretching process may be a uniaxial stretching process or a biaxial stretching process. The stretching ratio of the laminate is preferably as high as possible for physical properties. This makes it possible to produce stretched formed products excellent in gas barrier property without pinholes, cracking, uneven stretching, uneven thickness, delamination (interlayer separation), and the like which may otherwise occur during the stretching.

Other exemplary methods for stretching the multilayer structure include roll stretching method, tenter stretching method, tubular stretching method, stretch-blowing method, and vacuum pressure forming method each having a higher stretching ratio. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The heat-setting may be achieved by heat-treating the stretched film at 80° C. to 170° C., preferably 100° C. to 160° C., for about 2 to about 600 seconds while keeping the stretched film in tension.

Where the multilayer structure is used for heat-shrink packaging applications for raw meat, processed meat, cheese or the like, the multilayer structure not subjected to the heat-setting process after the stretching is used as a product film, and the raw meat, the processed meat, the cheese or the like is wrapped with the film, which is in turn heat-treated at 50° C. to 130° C., preferably 70° C. to 120° C., for about 2 to about 300 seconds to be thereby heat-shrunk for tight packaging.

The multilayer structure thus produced may be used in any desired form. Exemplary forms include film, sheet, tape, and profile extrusion product. As required, the multilayer structure may be subjected to heat treatment, cooling process, rolling process, printing process, dry laminating process, solution or melt coating process, bag making process, deep drawing process, box making process, tube making process, splitting process, or the like.

Bags, cups, trays, tubes, bottles, and other containers, and caps produced from the film, the sheet or the stretched film formed in the aforementioned manner are excellent in appearance substantially without coloration, fisheyes, and the like and, therefore, are useful as packaging materials which need to satisfy stricter requirements for the gas barrier properties and the appearance. More specifically, these packaging material containers are useful for general foods, condiments such as mayonnaise and dressing, fermented foods such as miso, fat and oil such as salad oil, beverages, cosmetics, and pharmaceutical products.

EXAMPLES

Embodiments of the present disclosure will hereinafter be described more specifically by way of examples thereof. However, it should be understood that the embodiments of the present disclosure be not limited to these examples within the scope of the present disclosure.

In the following examples, the unit "parts" is based on weight.

First, measurement/evaluation methods for pellets used in Examples and Comparative Examples will be described.

Measurement/Evaluation Methods (1) Overall conjugated polyene (sorbic acid) content of pellets Where the conjugated polyene was directly added to the surfaces of the pellets of the EVOH, the amount of the added conjugated polyene was regarded as the conjugated polyene content of the EVOH pellets. Where the conjugated polyene was present within the conjugated polyene- (and alkali earth metal-) containing EVOH pellets, the conjugated polyene content was determined by the following measurement method.

The conjugated polyene- (and alkali earth metal-) containing EVOH pellets were freeze-pulverized, and 8 mL of an extraction solvent having a distilled water/methanol volume ratio of 1/1 was added to 1 g of the resulting EVOH powder. The resulting solution was ultrasonically treated still at a temperature of 20° C. for 1 hour, whereby sorbic acid was extracted from the resin. The resulting solution was cooled, and then diluted with the extraction solvent to a volume of 10 mL. The resulting solution was filtered with a filter having a pore size of 0.45 μm, and then analyzed by a liquid chromatography/UV spectrophotometer, whereby the amount of sorbic acid contained in the extraction solution was determined.

[HPLC Measurement Conditions]
LC system: Agilent 1260/1290 (available from Agilent Technologies, Inc.)
Detector: Agilent 1260 infinity diode array detector (available from Agilent Technologies, Inc.)
Column: Cadenza CD-C18 (100×3.0 mm, 3 μm) (available from Imtakt Corporation
Column Temperature: 40° C.
Mobile phase A: Aqueous solution containing 0.05% formic acid and 5% acetonitrile
Mobile phase B: Aqueous solution containing 0.05% formic acid and 95% acetonitrile
Time program: 0.0 to 5.0 minutes B (%)=30%
   5.0 to 8.0 minutes B (%)=30% to 50%
   8.0 to 10.0 minutes B (%)=50%
   10.0 to 13.0 minutes B (%)=50% to 30%
13.0 to 15.0 minutes B (%)=30%
Flow rate: 0.2 mL/minute
UV detection wavelength: 190 to 400 nm
Quantitative wavelength: 262 nm In the HPLC measurement conditions, "%" means vol. %.

(2) Conjugated polyene (sorbic acid) content of pellet surface portions

First, 20 g of the conjugated polyene- (and alkali earth metal-) containing EVOH pellets were immersed in 30 mL of an extraction solvent (having a distilled water/methanol volume ratio of 1/1) with stirring at 20° C. for 10 minutes, whereby the conjugated polyene was extracted from the EVOH pellets. Then, the resulting extraction liquid was concentrated to 2 mL, and filtered with a filter having a pore size of 0.45 μm. The resulting filtrate was used as a sample liquid, which was analyzed by liquid chromatography to determine the amount of the conjugated polyene contained in the filtrate. The amount of the conjugated polyene thus determined was divided by the weight (20 g) of the conjugated polyene- (and alkali earth metal-) containing EVOH pellets, whereby the conjugated polyene content of the pellet surface portions was determined. The analysis by the liquid chromatography was performed under the same conditions as for the determination of the overall conjugated polyene content of the pellets.

(3) Alkali earth metal content of pellets

Where the alkali earth metal compound was directly added to the conjugated polyene- (and alkali earth metal-) containing EVOH pellets, the alkali earth metal amount of the added alkali earth metal compound was regarded as the alkali earth metal content of the conjugated polyene- (and alkali earth metal-) containing EVOH pellets.

(4) Water content (wt. %) of pellets

A volatile content was determined based on the weights of the conjugated polyene- (and alkali earth metal-) containing EVOH pellets before and after drying at a temperature of 150° C. for 5 hours. The volatile content was regarded as the water content of the conjugated polyene- (and alkali earth metal-) containing EVOH pellets. More specifically, the water content was calculated from the following expression:

Water content (wt. %)=$[(W_b-W_a)/W_b] \times 100$ wherein $W_b$ is the weight of the conjugated polyene- (and alkali earth metal-) containing EVOH pellets before the drying, and $W_a$ is the weight of the conjugated polyene- (and alkali earth metal-) containing EVOH pellets before the drying.

(5) Fisheyes

A single-layer film having a thickness of 30 μm was formed under the following film forming conditions by using the conjugated polyene- (and alkali earth metal-) containing EVOH pellets.

The number of fisheyes present in the 30-μm thick single-layer film was measured by means of a digital defect inspecting apparatus (GX-70LT available from Mamiya-OP Co., Ltd.)

The number of the fisheyes was determined by applying light from a lower side of the single-layer film and counting the number of light non-transmissive parts (having a diameter of 0.1 to 0.2 mm) per 100 cm² (10 cm×10 cm) of the film.

For the measurement, the reading speed was 3 m/minute.
[Film forming conditions]
Extruder: Having a diameter (D) of 40 mm and L/D of 28
Screw: Full flight type having a compression ratio of 2.5
Screen pack: 60/90/60 mesh
Die: Coat hanger type having a width of 450 mm
Temperature setting:
C1/C2/C3/C4/A/D=180/200/220/220/210/210° C.
Screw rotation speed: 40 rpm
Roll temperature: 80° C.

(6) Feedability

The number of abnormal noises occurring immediately below the hopper of the extruder in one minute during the film formation under the aforementioned film forming conditions was measured by means of a sound rod.

(7) Evaluation for draw resonance resistance

While a film was formed from the conjugated polyene- (and alkali earth metal-) containing EVOH pellets under the aforementioned conditions by the extruder, the width of the film was measured at an interval of 40 cm for a length of 4 m in the machine direction for observation of necking fluctuation caused by draw resonance. Based on the necking fluctuation, the film was evaluated for draw resonance resistance.

Excellent (oo): A difference between the maximum width and the minimum width of the film was less than 5 mm.
Acceptable (o): A difference between the maximum width and the minimum width of the film was not less than 5 mm and less than 15 mm.
Unacceptable (x): A difference between the maximum width and the minimum width of the film was not less than 15 mm.

Production of Conjugated Polyene- and Alkali Earth Metal-Containing EVOH Pellets Example 1

After 500 parts of vinyl acetate, 100 parts of methanol, 0.0585 parts of acetyl peroxide, and 0.015 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm². Then, the internal temperature of the polymerization can was increased to 67° C. under ethylene pressure with stirring, whereby the polymerization was started. When the polymerization degree reached 60% after a lapse of 6 hours from the start of the polymerization, 0.0525 parts of sorbic acid was added as a polymerization inhibitor to the polymerization can. Thus, an ethylene-vinyl acetate copolymer having an ethylene structural unit content of 32.5 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.007 equivalents per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 30 wt. % of EVOH and 70 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 40 wt. % and a water/methanol weight ratio of 40/60 was prepared. The water/methanol mixed solution of the EVOH was extruded into strands in cooling water. The strands (hydrous porous strands) were cut by a cutter, whereby porous pellets each having a diameter of 3.8 mm, a length of 4 mm, and an EVOH content of 35 wt. % were produced.

The porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 1 hour. This rinsing treatment was performed five times. Then, the resulting porous pellets were dried at 110° C. for 8 hours in a nitrogen stream having an oxygen concentration of not higher than 0.5 vol. %. Thus, EVOH pellets having a water content of 0.15 wt. %, a sodium content of 0.06 wt. %, and a boric acid content of 0.015 wt. % (on a boron basis) based on the weight of the EVOH were produced. The pellets had an MFR of 3.8 g/10 minutes (as measured at 210° C. with a load of 2160 g). The EVOH pellets (conjugated polyene-containing EVOH pellets) thus produced had an overall conjugated polyene content of 150 ppm and a surface conjugated polyene content of 39 ppb as measured by the aforementioned evaluation methods.

The conjugated polyene-containing EVOH pellets were dry-blended with magnesium stearate so as to have an alkali earth metal content of 30 ppm on a weight basis. Thus, conjugated polyene- and alkali earth metal-containing EVOH pellets were produced.

The conjugated polyene- and alkali earth metal-containing EVOH pellets thus produced were evaluated for the occurrence of fisheyes by the aforementioned method. The conjugated polyene- and alkali earth metal-containing EVOH pellets were further evaluated for formability (feedability and draw resonance resistance) in film formation. The results are shown below in Table 1.

Example 2

After 962 parts of vinyl acetate, 100 parts of methanol, 0.1106 parts of acetyl peroxide, and 0.016 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 43.8 kg/cm$^2$. Then, the internal temperature of the polymerization can was increased to 67° C. under ethylene pressure with stirring, whereby the polymerization was started. When the polymerization degree reached 38% after a lapse of 3.5 hours from the start of the polymerization, 0.2886 parts of sorbic acid was added as a polymerization inhibitor to the polymerization can. Thus, an ethylene-vinyl acetate copolymer having an ethylene structural unit content of 34.0 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.010 equivalent per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 37.6 wt. % of EVOH and 72.4 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 42 wt. % and a water/methanol weight ratio of 40/60 was prepared. The water/methanol mixed solution of the EVOH was extruded into strands in cooling water. The strands (hydrous porous strands) were cut by a cutter, whereby porous pellets each having a diameter of 3.5 mm, a length of 3.7 mm, and an EVOH content of 35 wt. % were produced.

The porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 2.5 hours. Then, the resulting porous pellets were dried at 105° C. for 8 hours in a nitrogen stream having an oxygen concentration of not higher than 0. 5 vol. %. Thus, EVOH pellets having a water content of 0.15 wt. %, a sodium content of 0.06 wt. %, and a boric acid content of 0.015 wt. % (on a boron basis) based on the weight of the EVOH were produced. The pellets had an MFR of 3.8 g/10 minutes (as measured at 210° C. with a load of 2160 g). The EVOH pellets (conjugated polyene-containing EVOH pellets) thus produced had an overall conjugated polyene content of 340 ppm and a surface conjugated polyene content of 350 ppb as measured by the aforementioned evaluation methods.

The conjugated polyene-containing EVOH pellets were dry-blended with magnesium stearate so as to have an alkali earth metal content of 10 ppm on a weight basis. Thus, conjugated polyene- and alkali earth metal-containing EVOH pellets were produced.

Subsequently, the conjugated polyene- and alkali earth metal-containing EVOH pellets thus produced were evaluated for the occurrence of fisheyes, the feedability, and the draw resonance resistance in the same manner as in Example 1. The results are shown below in Table 1.

Comparative Examples 1 and 2

EVOH pellets were produced in substantially the same manner as in Example 1, except that the alkali earth metal content was adjusted as shown below in Table 1.

Subsequently, the pellets were evaluated for the occurrence of fisheyes, the feedability, and the draw resonance resistance in the same manner as in Example 1. The results are shown below in Table 1.

TABLE 1

|  | Example 1 | Example 2 | Comparative Example 1 | Comparative Example 2 |
|---|---|---|---|---|
|  | Conjugated polyene (sorbic acid) | | | |
| Surface content (ppb) | 39 | 350 | 39 | 39 |
| Overall content (ppm) | 150 | 340 | 150 | 150 |
| Surface content/ Overall content | $2.6 \times 10^{-4}$ | $10.3 \times 10^{-4}$ | $2.6 \times 10^{-4}$ | $2.6 \times 10^{-4}$ |
| Alkali earth metal content (ppm) | 30 | 10 | 0 | 300 |
| Fisheyes/100 cm$^2$ | 1 | 1 | 1 | 4 |
| Feedability - Abnormal noises/minute | 17 | 19 | 24 | 14 |
| Draw resonance resistance | ○ | ○ | ○○ | x |

Table 1 indicates that, in Examples 1 and 2 in which the conjugated polyene content (i.e., the sorbic acid content) of the surface portions of the EVOH pellets was not lower than 30 ppb based on the weight of the pellets and the alkali earth metal content was 10 to 200 ppm based on the weight of the pellets, the fisheyes were suppressed, and the feedability and the draw resonance resistance were excellent.

In comparative Example 1 in which the surface sorbic acid content and the overall sorbic acid content were the same as in Example 1 but the alkali earth metal was not contained, in contrast, the feedability was insufficient. In Comparative Example 2 in which the alkali earth metal content was greater than the specific range, the fisheye-suppressing effect and the draw resonance resistance were insufficient.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The conjugated polyene- and alkali earth metal-containing EVOH pellets of the present disclosure are excellent in formability and capable of preventing the occurrence of the fisheyes and, therefore, can be advantageously used as a packaging material which needs to satisfy stricter requirements for film appearance. In the production method of the present disclosure, the conjugated polyene- and alkali earth metal-containing EVOH pellets of the present disclosure can be produced with the use of an existing production facility simply by changing the formulation of the pellet rinsing liquid.

The invention claimed is:

1. Conjugated polyene- and alkaline earth metal-containing ethylene-vinyl alcohol copolymer pellets comprising:
an ethylene-vinyl alcohol copolymer;
a conjugated polyene; and
at least one alkaline earth metal;
wherein pellet surface portions of the ethylene-vinyl alcohol copolymer pellets have a conjugated polyene content of not lower than 30 ppb based on the weight of the pellets,
wherein a weight-based content ratio (surface conjugated polyene content/overall conjugated polyene content) between the conjugated polyene content of the pellet surface portions and the overall conjugated polyene content of the conjugated polyene- and alkaline earth metal-containing ethylene-vinyl alcohol copolymer pellets is not lower than $1.5 \times 10^{-4}$, and
wherein a content of the alkaline earth metal is 1 to 200 ppm based on a weight of the pellets.

2. The conjugated polyene- and alkaline earth metal-containing ethylene-vinyl alcohol copolymer pellets according to claim 1, wherein the conjugated polyene content of the pellet surface portions is determined by dissolving 20 g of the conjugated polyene- and alkaline earth metal-containing ethylene-vinyl alcohol copolymer pellets in 30 mL of a mixed solvent having a distilled water/methanol volume ratio of 1/1 with stirring for 10 minutes, and dividing the conjugated polyene amount contained in a resulting solution by the weight of the ethylene-vinyl alcohol copolymer pellets.

3. The conjugated polyene- and alkaline earth metal-containing ethylene-vinyl alcohol copolymer pellets according to claim 1, wherein an upper limit of the conjugated polyene content of the surface portions is 10,000 ppb based on the weight of the pellets.

4. The conjugated polyene- and alkaline earth metal-containing ethylene-vinyl alcohol copolymer pellets according to claim 1, which have an overall conjugated polyene content of 0.1 to 10,000 ppm based on the weight of the pellets.

5. The conjugated polyene- and alkaline earth metal-containing ethylene-vinyl alcohol copolymer pellets according to claim 1, wherein the upper limit of the weight-based content ratio (surface conjugated polyene content/overall conjugated polyene content) between the conjugated polyene content of the pellet surface portions and the overall conjugated polyene content of the conjugated polyene- and alkali earth metal-containing ethylene-vinyl alcohol copolymer pellets is $1 \times 10^{-2}$.

6. The conjugated polyene- and alkaline earth metal-containing ethylene-vinyl alcohol copolymer pellets according to claim 1, wherein the conjugated polyene is at least one selected from the group consisting of sorbic acid, a sorbic acid ester, and a sorbic acid salt.

7. A method for producing the conjugated polyene- and alkaline earth metal-containing ethylene-vinyl alcohol copolymer pellets according to claim 1, comprising:
bringing pellets of an ethylene-vinyl alcohol copolymer into contact with a treatment liquid containing a conjugated polyene; and
bringing the pellets of the ethylene-vinyl alcohol copolymer into contact with an alkali earth metal.

8. The conjugated polyene- and alkaline earth metal-containing ethylene-vinyl alcohol copolymer pellet production method according to claim 7, wherein the pellets of the ethylene-vinyl alcohol copolymer are prepared by solidifying and pelletizing an alcohol solution or a water/alcohol mixed solution of the ethylene-vinyl alcohol copolymer.

9. The conjugated polyene- and alkaline earth metal-containing ethylene-vinyl alcohol copolymer pellet production method according to claim 7, wherein the pellets of the ethylene-vinyl alcohol copolymer are porous pellets of the ethylene-vinyl alcohol copolymer.

10. The conjugated polyene- and alkaline earth metal-containing ethylene-vinyl alcohol copolymer pellet production method according to claim 7, further comprising adding the conjugated polyene as a polymerization inhibitor to an ethylene-vinyl ester copolymer and then saponifying the ethylene-vinyl ester copolymer to prepare the ethylene-vinyl alcohol copolymer.

* * * * *